United States Patent
Lievore

[11] 3,787,073
[45] Jan. 22, 1974

[54] SUSPENSION SYSTEM

[75] Inventor: Silvano Giuseppe Lievore, Elkhart, Ind.

[73] Assignee: Elkhart, Bridge & Iron, Inc., Elkhart, Ind.

[22] Filed: Dec. 14, 1972

[21] Appl. No.: 315,123

[52] U.S. Cl. ............................ 280/124 A, 267/20 R
[51] Int. Cl. ............................................. B60g 11/16
[58] Field of Search ................ 267/20 R, 20 A, 60; 280/124 A, 106.5

[56] References Cited
UNITED STATES PATENTS

| | | | |
|---|---|---|---|
| 2,872,210 | 2/1959 | Shaffer | 267/20 R |
| 3,400,947 | 9/1968 | Cottrill | 267/20 R |

Primary Examiner—Philip Goodham
Attorney, Agent, or Firm—John A. Young, Esq.

[57] ABSTRACT

A trailer is supported at each side by a vehicle wheel and the vehicle wheel is mounted on a stub axle portion of a shaft, the shaft being transversely supported along its length on the frame side. Each supported section of the shaft is pivotally supported through lugs which are secured to the side of the frame. The said support for the shaft includes two bellcrank levers one disposed at each side of the frame siderail and having a spring connection which yieldably opposes movement of the wheel in a vertical direction. The wheel is thus cushioned. The wheel is supported against turning except vertically and rotatably. Other movements relative to the frame are resisted by reason of the support for the shaft which is provided at spaced points along the length thereof. Thus, the wheel is stably mounted.

8 Claims, 8 Drawing Figures

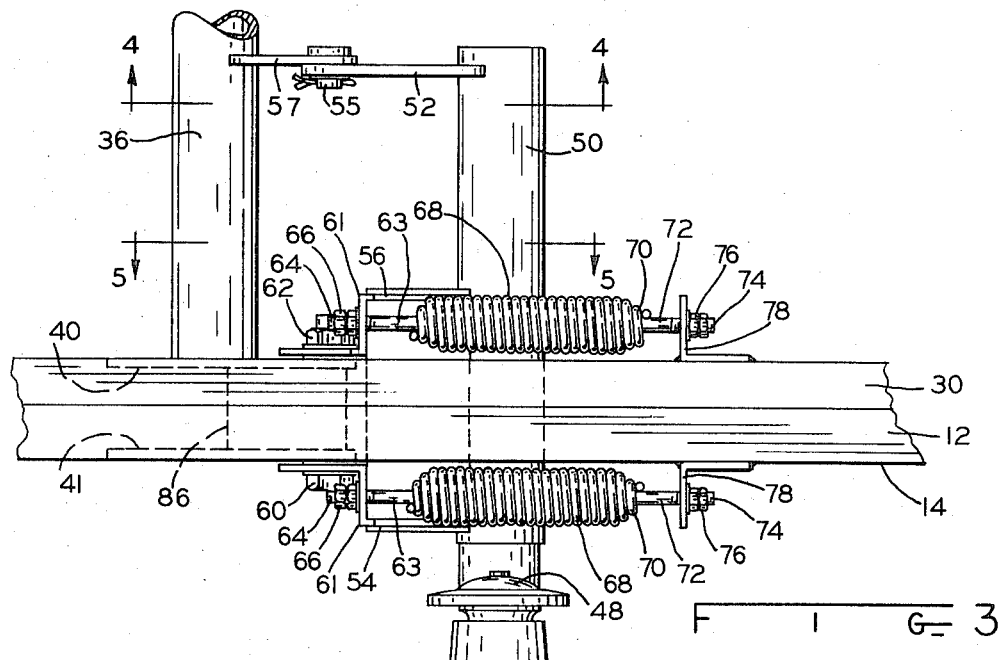
FIG. 3
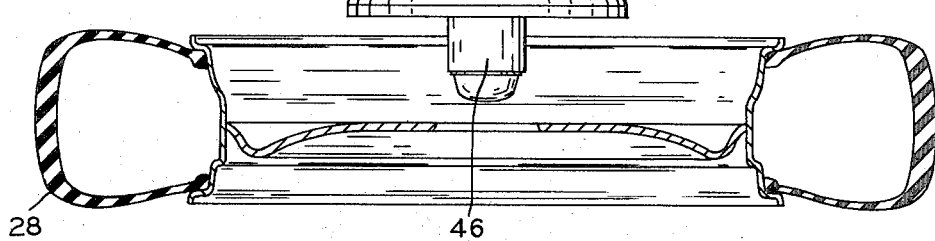
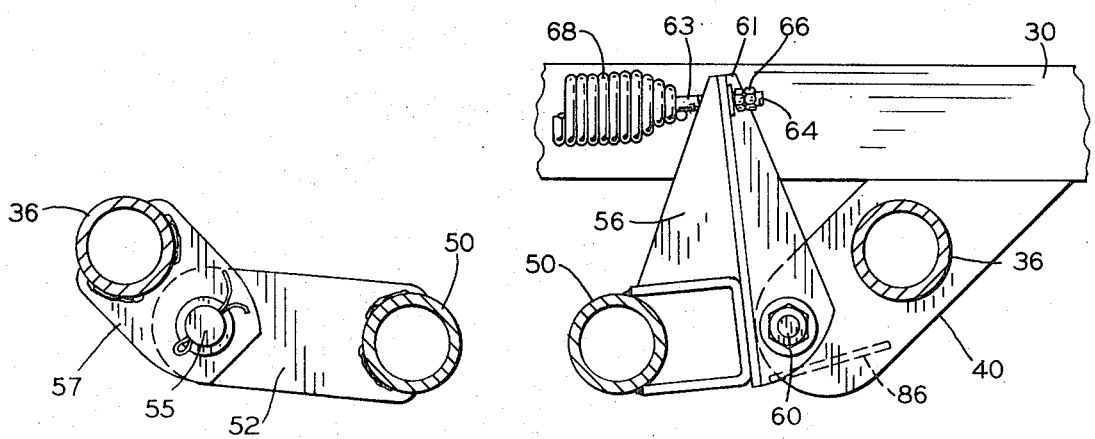
FIG. 4
FIG. 5

3,787,073

SUSPENSION SYSTEM

BACKGROUND OF THE INVENTION

In the trailer construction art provision must be made for adequate suspension for the trailer otherwise it tends to become unstable and the load carried by the trailer is in jeopardy of damage. Not only is it important that the trailer be stabilized for a good and efficient ride, but such is further important, insofar as it affects the steerability and track of the towing vehicle. Unfortunately, too little attention has been paid to suspension systems for the chassis of trailers and hence the art at the present time is lacking a stable and reliable suspension system for trailers and the like.

With a two wheel trailer suspension system, such as commonly found in light service trailers, it becomes even more important to stabilize the two wheels of the trailer because of the more limited ground support afforded between the ground and the trailer.

Quite obviously, with the advent of substantial increases in the number of boats and other recreational devices, the usage of two wheel trailers is on the increase and is projected to increase at an even faster rate in the years ahead. Since many of these trailers are towed by inexperienced drivers it is essential to improve the suspension system in order to prevent the occurrence of accidents which can produce damage to property and compromise the safety of the driver.

OBJECTS OF THE INVENTION

It is a foremost object of the present invention to provide a novel suspension system for trailers and the like which will improve the stability of the ride of the vehicle and is especially adapted for improving the cushioning and lateral support for the wheel during use.

Another object of the present invention is to provide a wheel mounting which provides resilient support against road shock while at the same time supporting the wheel in a stable position laterally of the frame. That is, the wheel is prevented from wobbling but is free to move rotatably and vertically but in no other direction. Consequently, an important feature of the present invention is the stable yet cushioned ride for the trailer load.

Another important object of the present invention is the provision of an inexpensive and simple suspension system which is easy to provide and relatively easy to service, consisting of only a few components additional to the conventional frame, and is readily susceptible to the inclusion of a disc brake or the like, for even further safety in hauling freight or other loads on the trailer Other objects and features of the present invention will become apparent from a consideration of the following description which proceeds with reference to the accompanying drawings wherein a single example embodiment of the invention has been selected to illustrate the invention.

DRAWINGS

FIG. 3 is a top view of the wheel and suspension system the wheel being the righthand wheel looking in the direction of the forward end of the trailer;

FIG. 4 is an enlarged sectional detail view taken on line 4—4 in FIG. 3;

FIG. 5 is an enlarged detail view looking in the direction of the arrows 5—5 in FIG. 3; and, FIGS. 6 and 7a, 7b are fragmentary detail views showing details of the spring construction and stop.

DETAILED DESCRIPTION OF THE INVENTION

Figure 1:
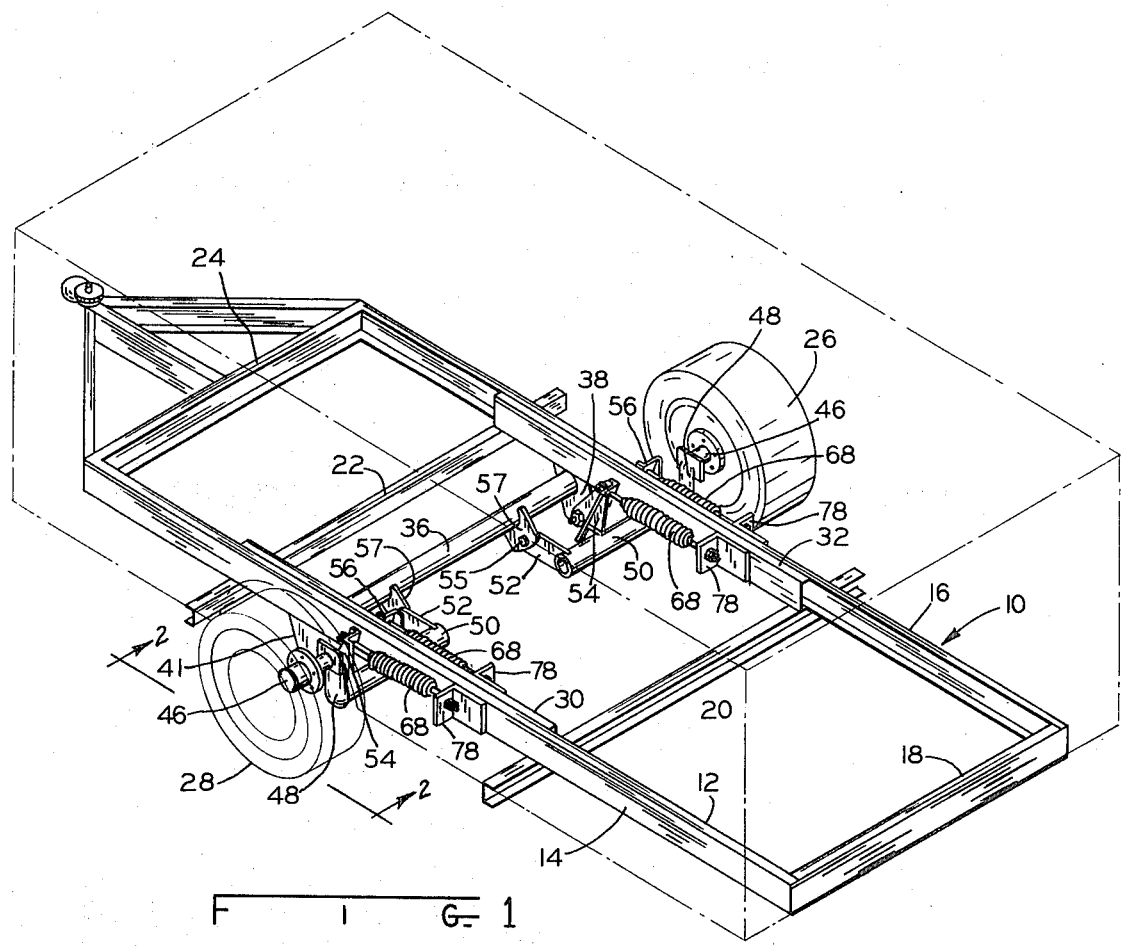
FIG. 1 is an isometric view of a trailer illustrating the frame and wheels of a suspension system.

Referring now to FIG. 1 a trailer designated generally by reference numeral 10 includes a frame 12 having side rails 14 and 16 with cross braces 18, 20, 22 and 24, forming a boxlike rigid construction. In the vicinity of ground engaging wheels 26 and 28 are second reinforcement members 30, 32 which reinforce side rails 14 and 16 at the location where the supportive load is transmitted to the frame. In addition, there is a further cross member 36 which is secured to depending lugs 38 and 40. Each wheel 26, 28 is rotatably mounted on an axle 46 which includes an integral laterally offset section 48 which in turn is connected to a shaft 50.

The shaft 50 is mounted on a link 52 and two bellcrank levers 54 and 56 one on each side of rails 14 and 16. Links 52 and each of the pairs of bellcrank levers 54, 56 are pivotally mounted on the frame, the link 52 being mounted through a pivot pin 55, and plate 56 to cross member 36 (FIG. 3) and the bellcranks being each mounted on pivot pins 60, 62 of depending lugs 38, 40 on the outboard and inboard sides of the side of the frame. In this way, the wheel axle and shaft 50 are free to move angularly about the respective pivot points 54, 60 and 62.

Figure 2:
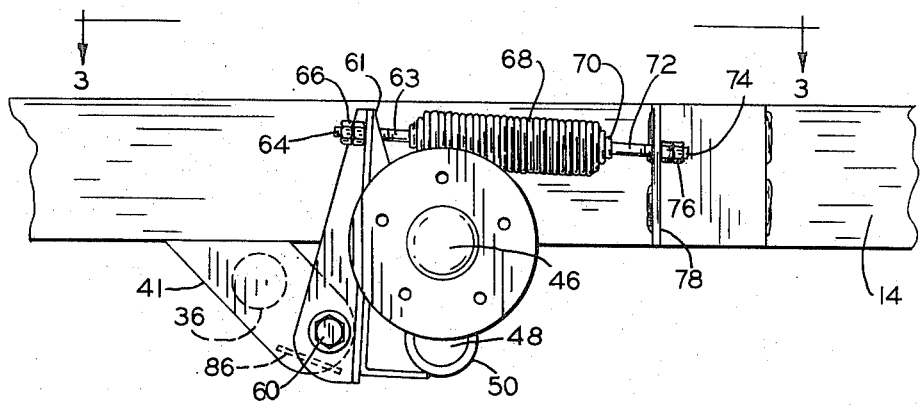
FIG. 2 is a side elevation view looking in the direction of the arrows 2—2 in FIG. 1.
Figure 6:
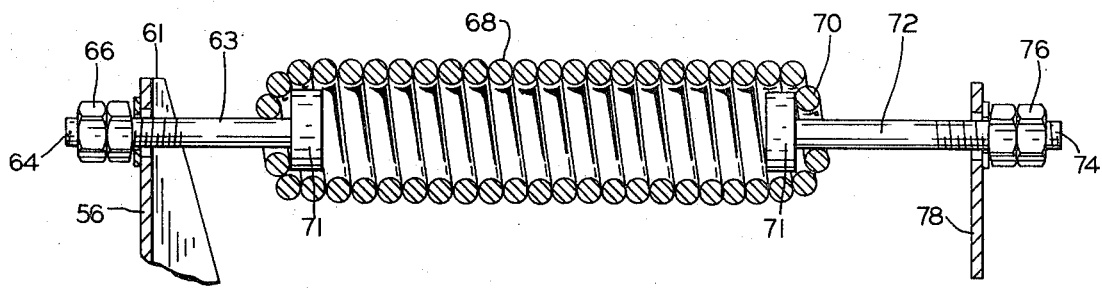

At the upper end 61 of each bellcrank lever is a rod 63 having a threaded end 64 and nuts 66 which secure the end of the rod to a helical spring 68. At the opposite end 70 of each helical spring 68 is a second rod 72 similarly attached to the end of the spring and also having a threaded end 74 with a nut 76 securing the spring to flange 78. It should be noted that a spring is located one on each side of the respective rails 14, 16 and the spring is stretched responsively to vertically upward movement of the wheel. Thus, as the bellcrank 54 (FIG. 2) moves counterclockwise on the pivot 60 by upward movement of the wheel on 46, the spring 68 is stretched from its relaxed position shown in FIG. 2, the spring being held at its opposite ends by flanges 71 of rods 63 and 72 (FIG. 6). Since there is a spring 68 located one on each side of a respective side rail, this will cause greater stability in resilient cushioning of the wheel and without imposing a twisting action on the wheel as it moves. The wheel is thus reliably damped against vertical movement and is resiliently cushioned against road shocks in a vertical manner.

It will be further noted that wheel movement in a vertical sense during the very first increment of such vertical movement, results in angular movement of the bellcrank which is immediately opposed by tension of the spring 68. Thus, for each increment of vertical movement of the wheel there is a corresponding increment of spring resistance force which is in direct proportion to the amount of vertical displacement of the wheel. The stretching of the spring to resist the vertically upward movement of the wheel also serves to restore the wheel to its original position.

The construction of the suspension system is achieved with only a relatively few number of parts and such parts are of a durable and heavy duty construction making them highly resistant to distortion under vertical load. Because the suspension system consists of a few number of components which are readily accessible for servicing the system is inexpensive to install and to keep in proper working order.

Tension on the springs is adjustable by reason of the nuts 66 and 76 which can be used to elongate the spring and hence change the spring rate according to the particular design of the spring and size of the trailer.

In previous suspension systems employing springs and other cushioning devices the resistance to vertical movement of the wheel developed objectionable twisting actions on the wheel and tire and in still other devices the resilient suspension means would fail to develop a resistance which was at all times proportional to the degree of vertical movement of the wheel. Both of those deficiencies are corrected in the present invention because of the presence of the spring one on each side of a respective frame member. Also, since the spring force is directed along the length of the spring and the bellcrank effects elongation which is substantially at all times proportional to the degree of wheel movement, the wheel is cushioned with a spring force proportional at all times to the extent of vertical displacement of the wheel.

The spring force does not impose twisting or distorting loads on the axle or the wheel and therefore will have less tendency to distort the wheel position and to "fight" vertical movement of the wheel in a vertical sense. As a result the wheel, axle and axle shaft are prevented from moving except in a prescribed manner and such movements are not accompanied by objectionable extraneous twisting forces which are unrelated to normal wheel movements. In the foregoing respects the invention has efficiently carried out its purposes.

Figures 7A, 7B:
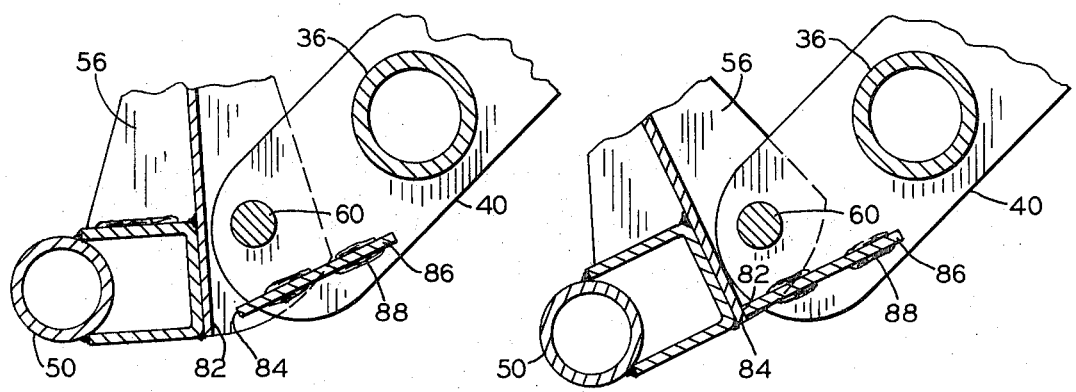

Referring to FIGS. 7a and 7b, the bellcranks 54, 56 are limited in angular movement during downward movement of the wheel by engagement of abutments 82 with surfaces 84 of plates 86 welded at 88 to lugs 40, 41 (FIG. 3). Thus the wheels are limited in the amount of "drop-off" into chuckholes or the like. The described dropping action of the wheel corresponds to counterclockwise movement of the bellcranks 56 (FIG. 7a) to the maximum downward position of 7b at which point the wheel is at its maximum downward position.

Although the present invention has been illustrated and described in connection with a few selected example embodiments, it will be understood that these are illustrative of the invention and are by no means restrictive thereof. It is reasonably to be expected that those skilled in this art can make numerous revisions and adaptations of the invention and it is intended that such revisions and adaptations will be included within the scope of the following claims as equivalents of the invention.

What I claim is:

1. In a suspension system for vehicles, a frame, a mounting lug disposed one at each side of the frame members at the lateral portions of the frame, a bellcrank pivotally mounted on said lugs, an axle and axle shaft adapted to receive a vehicle wheel thereon and secured to said bellcranks at spaced portions at the inboard and outboard sides of a respective frame side, the upwardly projecting ends of each of said bellcranks being substantially horizontally movable during the first increment of angular movement, and spring means operatively connected to said upright portion and adapted to yieldably resist movement of the wheel in a vertical direction by the combined resistance of said resilient means.

2. A suspension system in accordance with claim 1 including means for receiving and supporting the pair of resilient members whereby relative movement of said bellcrank lever is opposed by a relatively constant form in each increment of movement by said bellcrank levers.

3. The apparatus in accordance with claim 1 including a cross member extending between and secured to its opposite end one to each of a respective side member of said frame to hold said frame rigidly together.

4. The frame construction in accordance with claim 3 including two coil springs one connected to each of a respective pair of rods whereby said rods act against the spring force of opposite ends of said spring.

5. A frame construction in accordance with claim 1 wherein said axle is stepped and includes a stub axle portion adapted to receive the wheel and the remainder portions of the axle is supported at spaced points by said bellcranks.

6. A suspension system for trailers and the like having a frame and two laterally spaced side rails, said suspension system comprising a stub axle, a laterally offset shaft, two bellcranks disposed one on each side of a respective side rail and secured to said shaft, means secured to the end of said axle shaft, and means forming pivot connections between said frame and each of the bellcranks and said mounting means whereby said axle shaft and bellcranks are jointly pivoted to provide vertical movement of said axle and axle shaft, resilient spring means disposed one on each side of a respective side rail and secured operatively to said frame, and at the opposite ends to a respective one of said bellcranks to resist yieldably pivotable movement of said bellcranks whereby vertical movement of said shaft is yieldably opposed by force which is proportional to the degree of vertical movement.

7. The suspension system in accordance with claim 6 and means forming a stop to limit the pivotable movement of aid bellcranks relatively to said frame.

8. The suspension system in accordance with claim 6 wherein said bellcranks and mounting means disposed at the end of said shaft are spaced apart and proportioned to preclude twisting of the shaft and limit movement thereof to angular movement about the pivot connections between said bellcranks, mounting means, and their respective pivot connections to said frame.

* * * * *